United States Patent [19]
Sorg et al.

[11] Patent Number: 5,630,860
[45] Date of Patent: *May 20, 1997

[54] METHOD AND APPARATUS FOR CONDITIONING AND HOMOGENIZING A GLASS STREAM

[75] Inventors: Helmut Sorg, Glattbach; Richard Sims, Lohr am Main, both of Germany

[73] Assignee: Beteiligungen Sorg GmbH & Co. KG, Lohr am Main, Germany

[*] Notice: The term of this patent shall not extend beyond the expiration date of Pat. No. 5,573,569.

[21] Appl. No.: 238,245

[22] Filed: May 4, 1994

Related U.S. Application Data

[63] Continuation-in-part of Ser. No. 175,283, Dec. 29, 1993, abandoned.

[30] Foreign Application Priority Data

Jun. 15, 1993 [DE] Germany ........................... 43 19 773.6
Mar. 30, 1994 [DE] Germany ........................... 44 11 038.3

[51] Int. Cl.[6] ............................. C03B 5/23; C03B 5/18
[52] U.S. Cl. ................. 65/135.1; 65/135.3; 65/136.4; 65/178; 65/346
[58] Field of Search ............................ 65/135.1, 135.3, 65/136.4, 137, 346, 326, 337, 178, 160

[56] References Cited

U.S. PATENT DOCUMENTS

| | | |
|---|---|---|
| 1,845,824 | 2/1932 | Amsler . |
| 1,986,575 | 1/1935 | Honiss . |
| 2,394,893 | 2/1946 | Brown . |
| 3,133,803 | 5/1964 | Denman . |
| 3,248,203 | 4/1966 | Cunningham . |
| 3,582,310 | 6/1971 | Avery et al. . |
| 3,645,712 | 2/1972 | Ihrig et al. . |
| 4,029,488 | 6/1977 | Rhett . |
| 4,146,375 | 3/1979 | MacPherson et al. ................. 65/137 |
| 4,652,293 | 3/1987 | Samejima et al. ..................... 65/136.4 |
| 4,693,740 | 9/1987 | Noiret et al. ........................... 65/136.4 |
| 4,738,706 | 4/1988 | Picinelli ................................. 65/137 |
| 4,764,198 | 8/1988 | Lythgoe ................................. 65/346 |
| 4,854,960 | 8/1989 | Lindgren et al. . |

FOREIGN PATENT DOCUMENTS

| | | |
|---|---|---|
| 0212539 | 3/1987 | European Pat. Off. . |
| 2410763 | 9/1974 | Germany . |
| 2507015 | 9/1975 | Germany . |
| 3119816 | 1/1983 | Germany . |

OTHER PUBLICATIONS

Publication entitled "Glass–Making Today", P.J. Doyle Portcullis Press Redhill, 1979, p. 199.

Richard Sims, "Increased Conditioning Time Leads to Improved Thermal Homogeneity", Glass Industry magazine, Nov., 1991, pp. 8–15.

*Primary Examiner*—Peter Chin
*Assistant Examiner*—Steven P. Griffin
*Attorney, Agent, or Firm*—Hill, Steadman & Simpson

[57] ABSTRACT

A continuously flowing glass stream is conditioned and homogenized along a conditioning stretch, which extends from an entry side to at least one extraction point, and at the beginning of which there is a cooling zone, to which at least one homogenizing zone for the glass temperature is connected. In the working end or the distribution channel the temperature is reduced from the entry temperature T1 to an outlet temperature T2. In order to achieve the necessary conditioning and homogenization, even at high throughputs, the glass stream in the at least one cooling zone of the working end or distribution channel has a cross section with a depth/width ratio D/W of a maximum 0.6, or 0.5, or 0.4, or 0.3 or 0.2, whereby the maximum depth Dmax amounts to 300 or 250 or 200 mm, achieved by at least one bank raised from the bottom, and at least 50, or 60, or 70% of that amount of energy which corresponds to the temperature difference between T1 and T2 is removed from the glass bath along the total length of all the cooling zones.

22 Claims, 6 Drawing Sheets

METHOD AND APPARATUS FOR CONDITIONING AND HOMOGENIZING A GLASS STREAM

This is a continuation-in-part application of U.S. Ser. No. 08/175,283, filed Dec. 29, 1993, now abandoned.

BACKGROUND OF THE INVENTION

The invention concerns a method for conditioning and homogenizing a continuously flowing glass stream in a conditioning stretch, which extends from the inlet side of a working end or a distribution channel to at least one outlet in which there is at least one cooling zone, followed by at least one homogenizing zone for the glass temperature, whereby the temperature in the working end or the distribution channel is reduced from the inlet temperature T1 to the working temperature T2, preferably for the production of molded glass articles such as containers and pressed glass articles.

Whereas the temperatures necessary for melting glass depend on the composition, on the production process and on other facts, the temperatures required for processing the glass are normally lower than the melting temperatures of the glass. Consequently the glass must be cooled between the melting and working processes. Cooling of the glass is a part of the so-called "conditioning", during which the glass is prepared for processing. The achievement of the level of thermal homogeneity necessary for the particular working process is also part of the conditioning of the glass.

Conditioning of the glass can only take place when the glass has left the actual melting unit. In the past the conditioning was mainly carried out in the so-called forehearths or feeders. Nowadays the so-called working ends or distribution channels are also used for conditioning.

Certain developments in the recent past have radically changed the situation concerning the cooling of glass. Various improvements have been made in the melting furnaces which have resulted in a significant increase in the specific melting capacity, i.e. the melting capacity related to the area of the melting zone. Consequently the temperature of the glass leaving the furnace has increased. Other melting aids, such as bubblers or bottom heating, which have the effect of increasing the glass temperature on the bottom of the melting tank, have also led to an increase in the temperature of the glass leaving the melting tank.

Continual improvements have also been made to glass processing machines, amongst other things, to increase the throughput. Whereas in the 1960's and 1970's, machines for the mass production of containers were equipped with 6, 8 or 10 stations each for two gobs, nowadays 12 to 16 stations each for two gobs or ten stations each for three or four gobs are used. The throughput capacity of individual machines has therefore been greatly increased.

As a result of the factors mentioned above, significantly more heat must now be removed from the glass after it has left the melting tank and before it is worked than in the past. The increase in the throughput of the individual machines has also reduced the residence time of the glass in those parts of the system where the glass conditioning takes place. Thus, a greater amount of heat must be removed in a shorter time. This results in the fact that the productivity of the complete production line depends to a large extent on the cooling capacity along the conditioning stretch. However, numerous technical problems must also be taken into consideration.

As a result of the relatively high viscosity of the glass, the flow of glass in working ends and forehearths, the basic form of which is normally a channel, is laminar. It is usual for a velocity profile to be established in the glass bath, in which the maximum lies on the glass surface approximately in the center of the glass bath. As the viscosity depends on the temperature of the glass, there is an interaction between the glass temperature, the heat losses and velocity of the glass. Wherever the velocity in a particular area is lower, the resulting increase in the residence time leads to higher heat losses. Thus, the temperature sinks even further, and the increased viscosity leads to an additional decrease in the velocity.

At a constant throughput, a reduction of the velocity in one area automatically leads to an increase in the velocity in other areas with higher glass temperatures. This results in a reduction of the residence time in the higher temperature areas and so reduces the effective cooling capacity. For this reason the area of the glass bath affected by a cooling system must be clearly defined, and, as far as possible, this cooling area must avoid areas in which there are low flow velocities.

Areas of low temperatures and higher viscosity produce an effective reduction in the flow cross-section, which in turn leads to an increased drop in the glass level between the melting tank and the extraction point. This can also result in production disturbances.

Furthermore, when glass of a certain composition is cooled below a specific temperature limit, which is dependent on the glass composition, crystals can be formed, a process known as "devitrification". This process can also cause significant disturbance in the production. Therefore the cooling of the glass bath to temperatures below the devitrification temperature should be avoided. As crystal formation depends on both the temperature and time, the residence time of the glass in the critical temperature range is also an important factor.

The transport of heat within the glass bath itself is almost completely by radiation, whereby the heat transport velocity depends on the glass composition. For example, the presence of ferrous iron or chromium, which are used as coloring agents in green glass, reduces the rate of heat transport in the glass bath in comparison with a colorless glass. A similar situation also occurs with amber glass. This results in a delay in the heat transport from the lower areas of the glass bath. However, the lower areas of the glass bath must be cooled. If the cooling is applied too late, then no effective cooling effect can be observed in the lower areas of the glass bath before the glass reaches the extraction point.

Numerous cooling systems for glass conditioning are known, in most of which the heat transport is primarily by radiation. This type of heat removal is advantageous because the heat is not removed directly from the glass surface, but from a layer of the glass bath, the thickness of which depends on the radiation transmission of the glass. The Stefan-Boltzmann Law is used to calculate the amount of heat transported by radiation. An important factor in this mathematical function is the temperature difference between the radiator and receiver. Applying this function to a typical case for the glass industry, the temperature of the radiator is the temperature of the glass. Therefore the temperature of the receiver determines the amount of heat which is removed.

An effective cooling system is described in European Patent 0 212 539. Openings are made in the roof of the conditioning stretch, the effective area of which can be varied by means of sliding tiles. In this way the surroundings are used as a radiation receiver, with the rate of heat transferred being determined by the effective area of the openings. Even in the worst case the temperature of the surroundings is under 100° C., and is therefore much lower than the temperatures which can be reached by radiation receivers in other systems. The cooling capacity per unit area is therefore much higher with this system. However, the radiation openings create a chimney effect and therefore cause convective air movement. Such movements are difficult to control and can lead to control problems.

Even when the cooling capacity is basically sufficient, there may still be problems with cooling the lower layers of the glass bath, which retain too high a temperature, particularly in colored glasses.

U.S. Pat. No. 2,394,893 teaches the use of a rake-like, cooled stirrer to systematically stir up the contents of a working end. This solution requires a complicated apparatus, and still does not achieve homogenization of the temperature distribution, as there is not sufficient distance available for temperature equalization at the different outlets of the working end.

German Patent DE-PS 25 07 015 describes the use of water cooled stirrers in the melting tank itself, between a melting and refining section with a high temperature on the one hand and a refining zone with a lower temperature on the other hand, in order to increase the homogenization and to improve the quality of the glass. However this requires a longer melting tank, and the problems connected with further cooling and temperature homogenization before the processing of the glass are not solved.

State-of-the-art technology is mainly concerned with cooling the glass in feeders or forehearths, which are normally connected to a distribution channel.

The article by Sims, published in "GLASS INDUSTRY", November 1991, pages 8–15, entitled "INCREASED CONDITIONING TIME LEADS TO IMPROVED THERMAL HOMOGENEITY" describes the use of open radiation cooling through openings of variable area in the superstructure, as applied to forehearths. The article also discloses the application of the same principle to the superstructure of working ends, in order to apply cooling as early as possible, and thereby obtain a long residence time in the homogenizing area. However, the cooling effect in this area is limited, as the glass bath depth in working ends and distribution channels, at least in the central areas of such, is normally relatively high, as a result of the situation of the Deep Refiner and the riser connected to it. In many cases the bottom of the working end or distribution channel is inclined upwards towards the forehearths, so that particularly difficult conditions for the cooling of the glass exist, especially in the deeper parts of the working end or distribution channel. This is the result of the fact that the energy can only or must be removed from the glass by radiation, whereby the radiation is increasingly inhibited as the glass depth increases, as the energy is reabsorbed by the upper layers of the glass.

The conditions are particularly difficult in the case of amber or green glasses, which absorb a significant proportion of the longer wavelength radiation. In "Glass Furnaces" (German—"Glasschmelzwannen"), published by the Springer Publishing Company in 1984, Trier, shows in a diagram on pages 211 and 212 that the radiation transmission of amber and green glasses at a temperature of 1300° is only approximately 15–25% of the transmission of white flint glass (for example for tableware or window glass). Increasingly poor cooling conditions therefore exist with both increasing glass bath depth and increasing glass color. This leads to increasingly large temperature differences between the glass surface and the bottom parts of the glass bath, so that the throughput current results in a slow moving cooler surface layer, with a fast moving hotter layer underneath. Particularly long homogenization zones are then necessary to compensate for these conditions, whereby such zones require significant amounts of energy. Furthermore, the space requirement cannot be easily solved. As already indicated, these problems also increase in severity by a factor of 4–6 as the glass color becomes darker.

The problem of cooling in the deeper areas of the glass bath could conceivably be solved by reducing the glass bath depth in the complete working end or distribution channel. However, this solution would lead to the establishment of a glass level loss as a result of the temperature dependance of the glass viscosity and the typical flow pattern which occurs in highly viscous liquids, whereby the extent of the glass level loss would increase with increasing throughput. High throughput levels are exactly what is required for modern glass production units. However, a significant glass level loss must be avoided in working ends or distribution channels, as this would make it impossible to apply the same production parameters at each outlet.

SUMMARY OF THE INVENTION

An object of the present invention is therefore to provide a method of the type described initially, in which both a strong cooling effect and good homogenization are achieved in the conditioning stretch at a high throughput.

As already demonstrated, these objectives are diametrically opposed to one another to a certain extent.

This object is achieved according to the invention by the application of the method described initially in which the cross section of the glass bath is set with a maximum depth/width ratio D/W of 0.6, achieved by at least one bank raised above the bottom of the at least one cooling zone of the working end or distribution channel, whereby the depth Dmax amounts to 300 mm, and in that at least 50% of the temperature difference between T1 and T2 is removed from the glass bath in the sum of all cooling zones of the working end or the distribution channel.

Expressed more simply, the aim of the invention is to create an area with a very shallow glass bath, in the working end or distribution channel in the area of the cooling zone(s), by at least one raised section of the bottom, and to remove as much heat as possible from this shallow area, so that, depending on the length of the total conditioning stretch, the longest possible homogenizing zone is available in which the remaining temperature differences can be equalized.

It is obvious that the situation improves further when the depth/width ratio D/W is reduced, for example to 0.5, 0.4, 0.3, 0.2 or less. All intermediate values are also advantageous.

Clearly, the advantages increase as the depth is reduced, for example, when the maximum depth Dmax can be made less than 300 mm, such as 250 mm, or 200 mm, or even less, when the cooling zone is located in a working end or in a distribution channel.

The extremely shallow glass bath depths mentioned here are not self-evident at the high throughputs required today. The reason for this is that a drop in level of the glass occurs along the length of the cooling zone and the remaining channel, the extent of which depends on the flow velocity. The flow velocity, and therefore the glass level drop, increases significantly with shallower glass baths.

It is obvious that the glass depth cannot be reduced below a certain minimum value in each specific case. These values can be determined by experiment.

It is also the intention of the invention to utilize a shallow bed cooling, with which it is possible to use known cooling over a limited area, and to use known cooling systems to remove an extremely large proportion of the heat from a relatively small area which is limited to the raised area of the bottom, whereby the amount of heat removed is proportional to the temperature difference between T1 and T2.

The temperature T1 is that at the outlet of the melting tank or that at the entry of the working end or the distribution channel, whereas temperature T2 is the temperature at the outlet of the working end or distribution channel. Temperature T1 is a result of the operating conditions required in the melting tank and typically lies in the range of 1350° to 1400° C. Temperature T1 is normally higher when the throughput or melting tank capacity is higher. Temperature T2 is determined by both the type of glass and by the forming process for the glass gobs normally produced, and typically lies in the range of 1120°–1180° C. According to the invention, the use of a wide and shallow channel in the region of the one or more raised areas (for a given throughput or a given flow velocity) permits an extremely high level of cooling in the shortest possible distance with a simultaneous reduction in the differences in the flow velocity and in the temperature, and therefore also in the viscosity.

Significant advantages are achieved if at least 50% of the temperature difference between T1 and T2 is reduced in the total of all the cooling zones of the working end or the distribution channel. However it is particularly advantageous if at least 60% or even at least 70% of the temperature difference between T1 and T2 is reduced in the total of all cooling zones.

As already mentioned, it is possible to use known measures or methods for removing heat. Bottom cooling can be achieved by means of cooling channels installed in the bottom of the conditioning stretch and/or by means of reduced insulation in the bottom area. Furthermore it is possible to install surface cooling, either as an alternative or an addition, by means of variable openings in the roof, and/or by blowing in a gas, such as air and/or by means of cooling units which are installed above the glass surface without touching the glass bath. Finally it is also possible to cool in the glass itself, for example with cooling units which are submerged in the glass and which can also have the same effect as stirrers.

Prior art methods can also be used for the subsequent temperature homogenization in the glass. Such methods include a homogenization zone of the appropriate length with the best possible thermal insulation to the surroundings, uncooled stirrers or deflector plates, and also gentle heating of the glass from above by means of radiation or within the glass by means of direct electrical resistance heating and appropriate heating electrodes.

The use of locally limited shallow bed cooling in accordance with the invention brings all the glass under the influence of the cooling system for a short time. In particular, the bottom of the glass bath is also subject to cooling, for example, by means of significant radiation upwards. This effectively suppresses the negative effects of the interactive relationships between temperature, viscosity, residence time and glass flow, which are otherwise found.

The concentrated cooling effect at the beginning of the conditioning stretch is of particular importance, as the temperature at this location is very high and the viscosity of the glass is very low.

The application of shallow bed cooling to the shortest possible length according to the invention allows the use of a basically linear channel, so that so-called "dead corners" can be avoided, as can additional heating of the glass in these dead corners. Furthermore the design of the cooling zone is made much more simple and the temperature distribution is homogenized to a large extent in the cooling zone.

The invention also concerns an apparatus for carrying out the process with a conditioning stretch, along which the glass flows continuously, which stretches from the inlet side of a working end or distribution channel to at least one outlet, and in which there is at least one cooling zone, which is connected to at least one homogenizing zone for the glass temperature.

In order to fulfill the aim of the invention, the apparatus according to the invention is characterized by the fact that in the at least one cooling zone of the working end or distribution channel at least one section of the bottom is raised and is used to achieve a cross section in the glass bath with a depth/width ratio D/W of a maximum of 0.6, whereby the maximum depth Dmax is 300 mm.

In connection with the reduction of these values the explanations given above are valid.

BRIEF DESCRIPTION OF THE DRAWINGS

Examples of the invention are explained in more detail below, with the aid of FIGS. 1 to 11.

DETAILED DESCRIPTION OF THE PREFERRED EMBODIMENTS

Unless otherwise stated the parts shown in section consist of the normal ceramic or mineral furnace and insulation materials.

Figure 1:
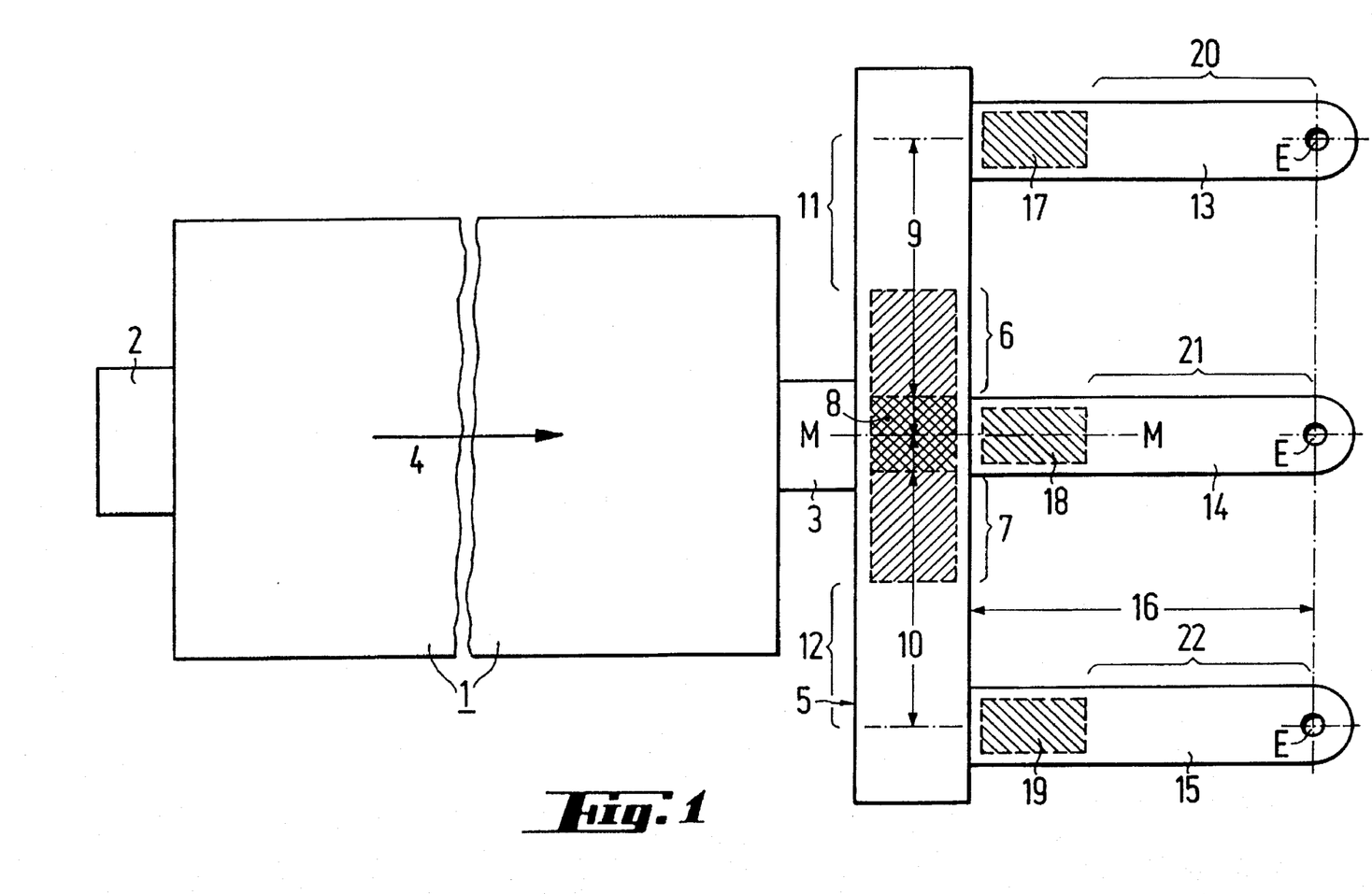
FIG. 1 is a schematic plan view of a melting tank, distribution channel and three forehearths, each with one extraction point.

FIG. 1 shows a melting tank 1, with a charging opening 2, which is normally constructed as a "doghouse", and the throat 3, through which the glass is removed from the melting tank. The glass formers, which can consist of the usual batch and cullet, and the resulting glass, flow through the melting tank in the direction of arrow 4. It is also possible to install several charging openings along both long sides of the melting tank, which produces a different flow pattern in the melter. A so-called riser can also be part of the throat 3. Such details are state of the art, so that no further particulars must be given here.

The distribution channel 5, which can also be constructed as a working end, is connected to the throat 3. In a first example of the invention, two cooling zones 6 and 7, which are indicated by hatching and are enclosed within a dotted line, are located one on each side of a central plane M—M. It is also possible to join these two cooling zones into a single cooling zone, in which case the cross hatched area 8 is then added.

Two conditioning stretches 9 and 10 are formed on both sides of the center line M—M, to which cooling zones 6 and 7 and, when applicable, area 8, belong. The remaining parts of the flow path of the glass melt then form the homogenizing zones 11 and 12. Homogenization of the temperature distribution is achieved as far as possible in the homogenizing zones.

In a second example of the invention three forehearths or feeders 13, 14 and 15 are connected to the distribution channel 5, each ending in an extraction point E. The total lengths of the forehearths 13, 14 and 15 in this example each constitute a conditioning stretch 16. In each of these conditioning stretches 16 there is a cooling zone 17, 18 or 19, which is marked by hatching and enclosed within a dotted line. It is emphasized that the diagram has been kept very simple in order to aid understanding. A homogenization zone 20, 21 and 22 follows each cooling zone in each of the conditioning stretches 16.

Figure 2:
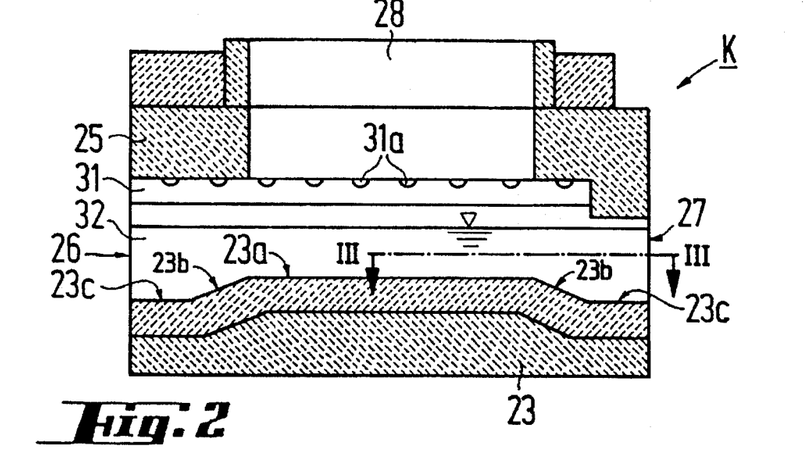
FIG. 2 is a longitudinal section through a cooling zone with radiation openings in the roof.
Figure 3:
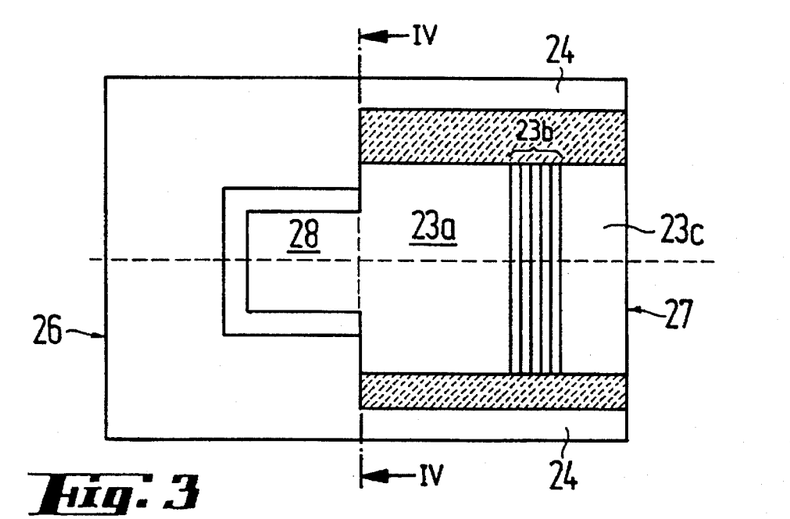
FIG. 3, on the left hand side, is a plan view of the object shown in FIG. 2, and on the right hand side, a section along the line III—III in FIG. 2 is shown.
Figure 4:
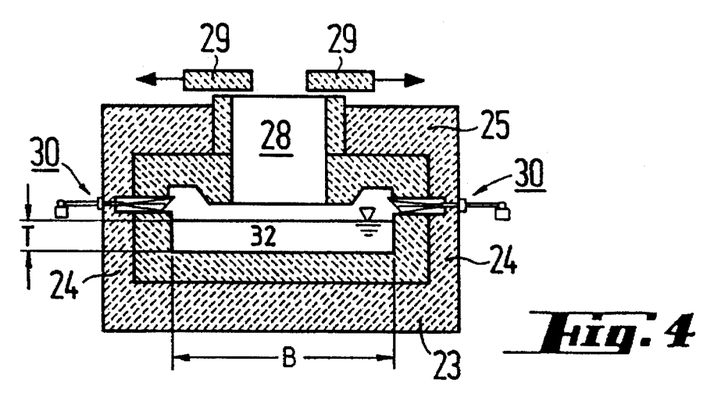
FIG. 4 is a cross section through the object shown in FIG. 3 along line IV—IV.

FIGS. 2, 3 and 4 show different views and sections of a cooling zone K, which can be installed as the cooling zones 6 and 7 in the distribution channel 5, or, if additionally required, as the cooling zones 17, 18 and 19 in the forehearths 13, 14 and 15. The cooling zones concerned represent a length of channel with a bottom 23, side walls 24 and a roof 25. The glass enters from the inlet side 26 and exits on the outlet side 27. In the example shown in FIGS. 2 and 3 a rectangular shaped opening 28 is provided in the roof 25, which allows loss of heat by radiation from the glass. In order to be able to control the flow of energy to the surroundings, covers 29 are located on top of the opening, by means of which the effective size of the opening 28 can be varied. The opening and closing movement is indicated by arrows. In both side walls 24 there are rows of burners 30 (FIG. 4), the nozzles of which are installed in the burner blocks 31. The burner blocks have openings 31a for the outlet of the combustion gases, which are shown in FIG. 2 as semicircles as the upper half is more or less hidden by ribs which reach down from the roof 25, as approximately shown in FIG. 4.

FIGS. 2 and 3 show that the bottom 23 has a raised area 23a over a length which roughly corresponds to the length of the opening 28. This raised area covers the complete width B of the channel cross section. The raised area 23a is connected to the lower bottom level 23c at both ends by means of sloping areas 23b. It can be clearly seen that the glass 32 is reduced to a very shallow cross section across this raised area 23a, which makes the high cooling capacity possible. The individual homogenizing zones follow on from the outlet side 27.

Figure 5:
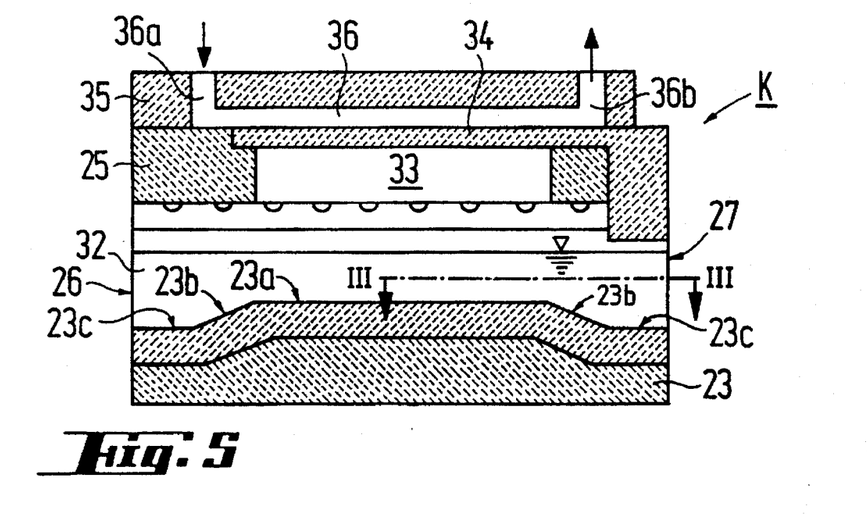
FIG. 5 is a longitudinal section through a cooling zone similar to that shown in FIG. 2, but with an enclosed cooling channel in the roof.

FIG. 5 shows a further version of the cooling zone K, in which a hole 33 in the roof 25 is covered with a plate 34, which in this case forms the radiation receiver for the heat radiated by the glass bath 32. A U-shaped channel 36 for the passage of cooling air is provided above the plate 34 within the superstructure refractory 35. The entry 36a and exit 36b of the channel 36 point upwards; the flow direction is indicated by arrows. The temperature of the plate 34 is influenced by the quantity of cooling air used, and the cooling effect on the glass bath is thereby varied.

Figure 6:
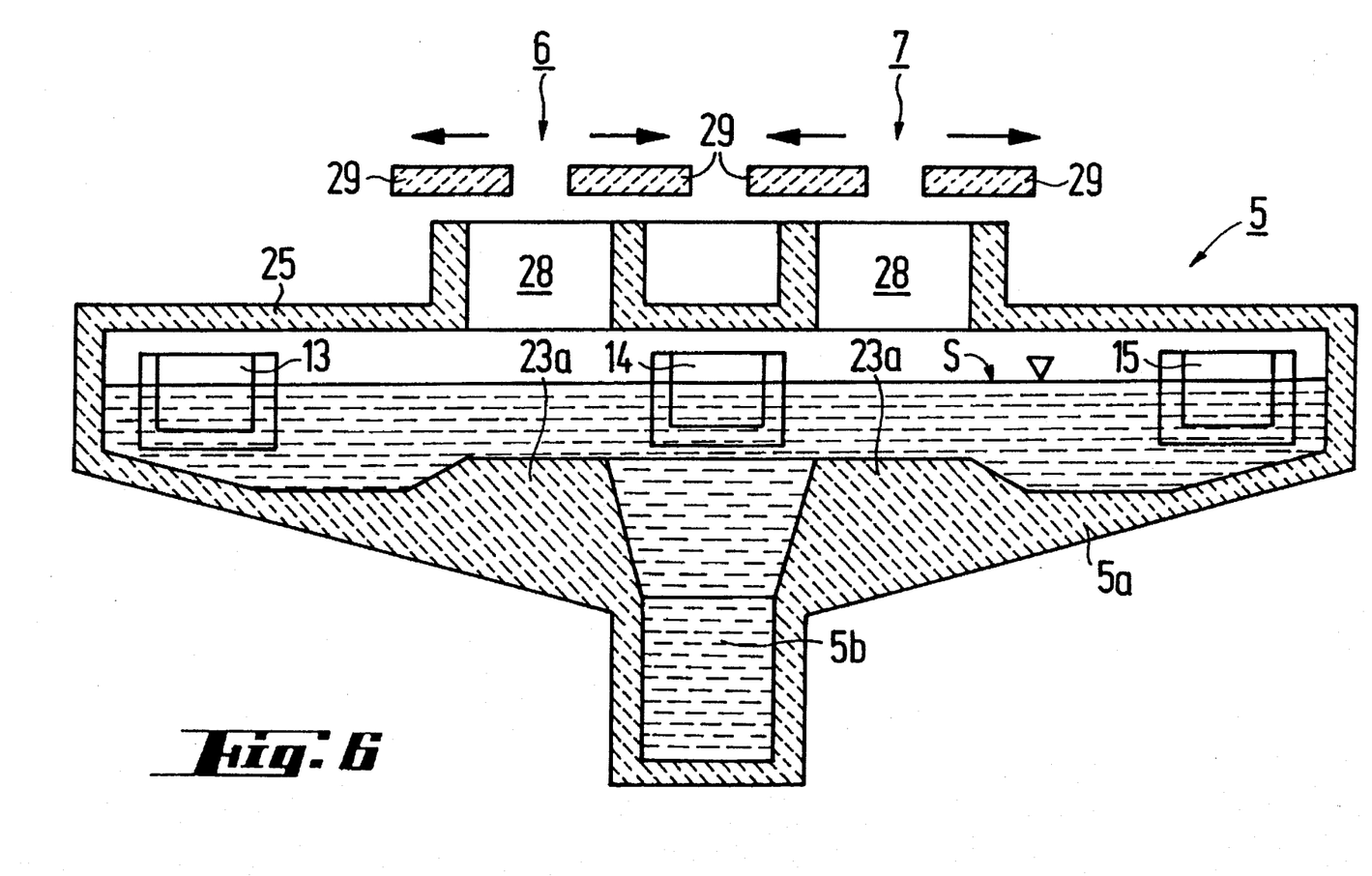
FIG. 6 is a longitudinal section through the distribution channel shown in FIG. 1 at a larger scale.

The longitudinal section of a distribution channel in FIG. 6 shows the cooling zones 6 and 7 which correspond to the cooling zones shown in FIGS. 2–4. The openings 28 are situated in the roof 25, which forms part of the so-called "superstructure" whereby the amount of energy removed is varied by the sliding tiles, as already described.

The throat 3 shown in FIG. I ends at the riser 5b, which leads into the bottom 5a of the distribution channel 5. The bottom of the distribution channel 5 is sloped upwards towards the two ends. The raised areas 23a of the bottom 5a already described are situated below the openings 28. The upper, flat, horizontal surfaces of these raised areas, and the glass surface S define the limited cross section with a shallow glass bath according to the invention. After the raised areas 23a of the bottom, the distribution channel 5 has a significantly greater glass bath depth, so that unacceptable loss of glass level is avoided. The forehearths 13, 14 and 15, which are shown in FIG. 1, are only visible here end-on. The direction of movement of the sliding tiles 29 is shown moved through an angle of 90° compared with that shown in FIG. 4. This difference has no effect on the operation and effectiveness of the tiles.

Figure 7:
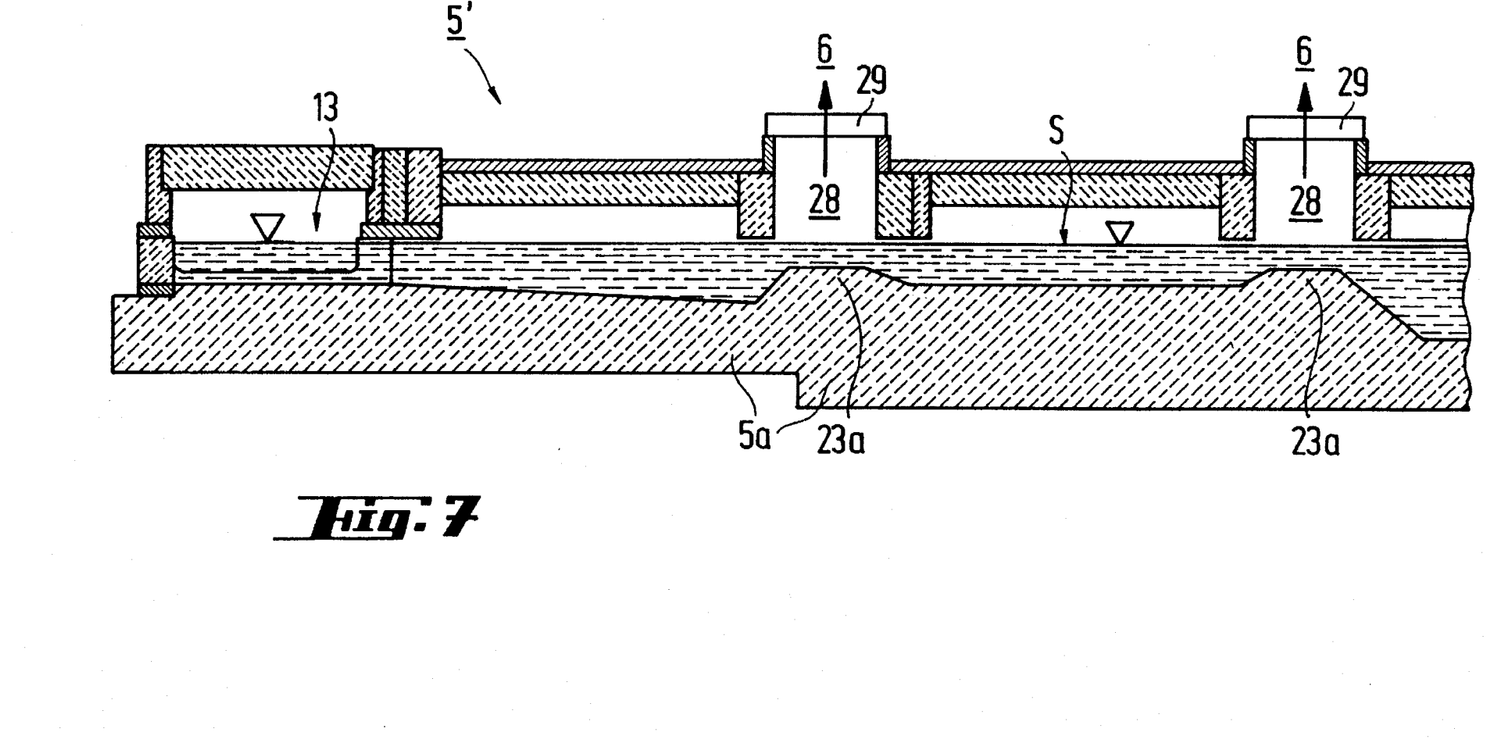
FIG. 7 is a longitudinal section similar to the left hand side of FIG. 6, showing a plurality of cooling zones in the distribution channel.

The distribution channel 5' according to the invention illustrated in FIG. 7 shows two raised areas 23a of the bottom 5a, which also show flat, horizontal upper surfaces, and which lie below the openings 28. Before, between and after the raised areas 23a the bottom 5a is clearly further away from the glass surface S. FIG. 7 can be considered to be to scale. The so-called "riser" lies to the right of the part of the distribution channel 5' shown in FIG. 7.

Figure 8:
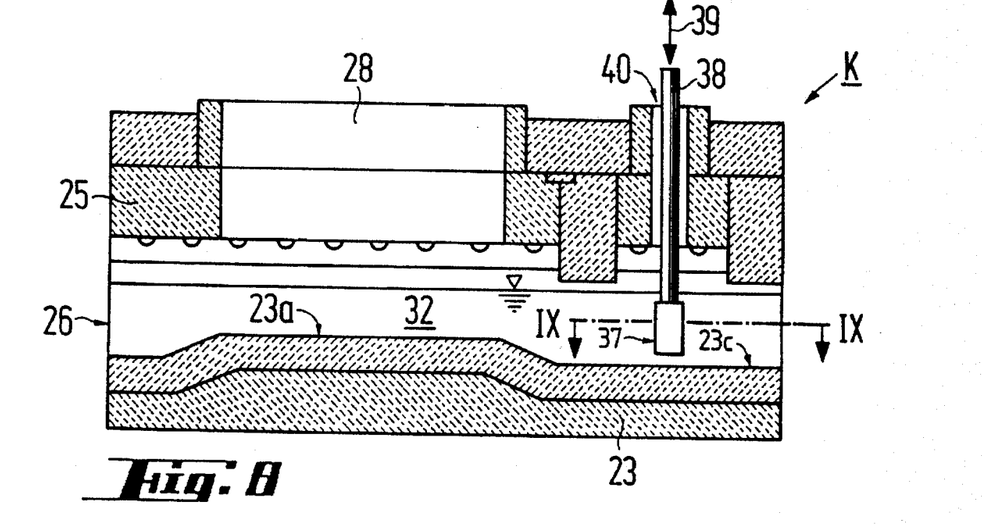
FIG. 8 is a longitudinal section through a cooling zone, which is extended to include a submerged cooling unit in the form of a barrier.
Figure 9:
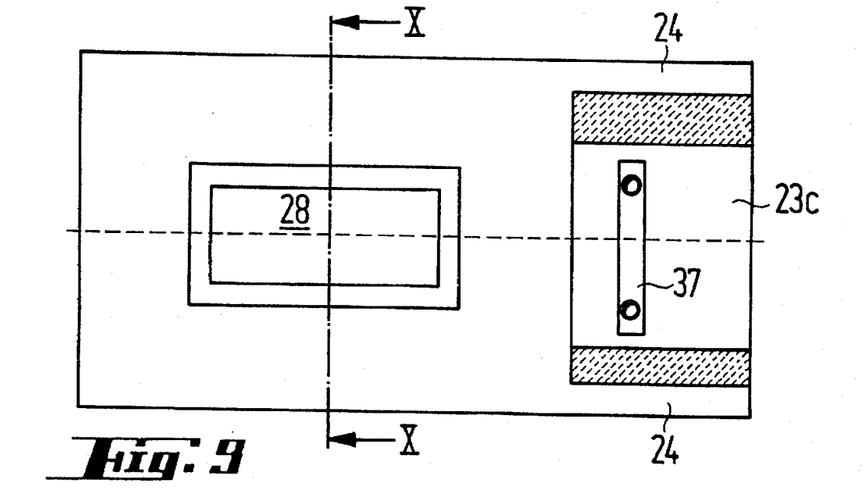
FIG. 9 is on the left hand side is a plan view of the object shown in FIG. 8, and on the right hand side a section along the line IX—IX in FIG. 8 is shown.
Figure 10:
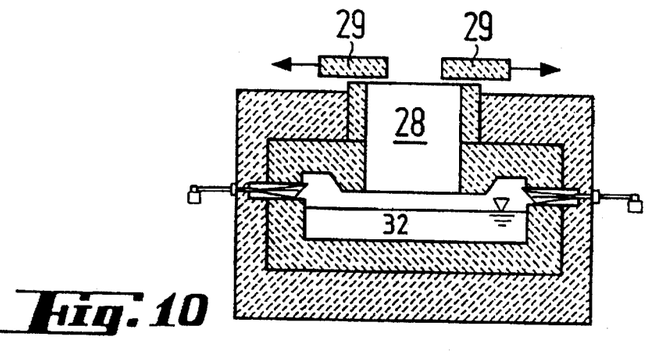
FIG. 10 is a cross section along line X—X through the object shown in FIG. 9.

The example shown in FIGS. 8, 9 and 10 is different from those previously described, in that, whilst otherwise maintaining similar geometric proportions to those in FIGS. 2, 3 and 4, a further area is provided after the raised area 23a of the bottom 23. In this further area a submerged cooling device 37 is installed above the lower bottom level 23c, the cooling device being supplied with a cooling medium via two vertical pipes 38. The supply pipes 38 can also be designed as concentric pipes, but this variant is not shown in detail. The cooling effect in the upper and/or lower regions of the glass bath 32 can be varied by raising or lowering the immersion cooling device 37 in the direction of the double arrow 39. The cooling effect can also be increased by periodic crosswise movement (transversely to the glass flow). Combined movements of the immersion cooler are also possible. It is also very easy to install the immersion cooler 37 in the form of a stirrer, in order to achieve additional homogenization of the temperature in the glass bath. The supply pipes 38 pass through an opening 40 in the roof 25.

Figure 11:
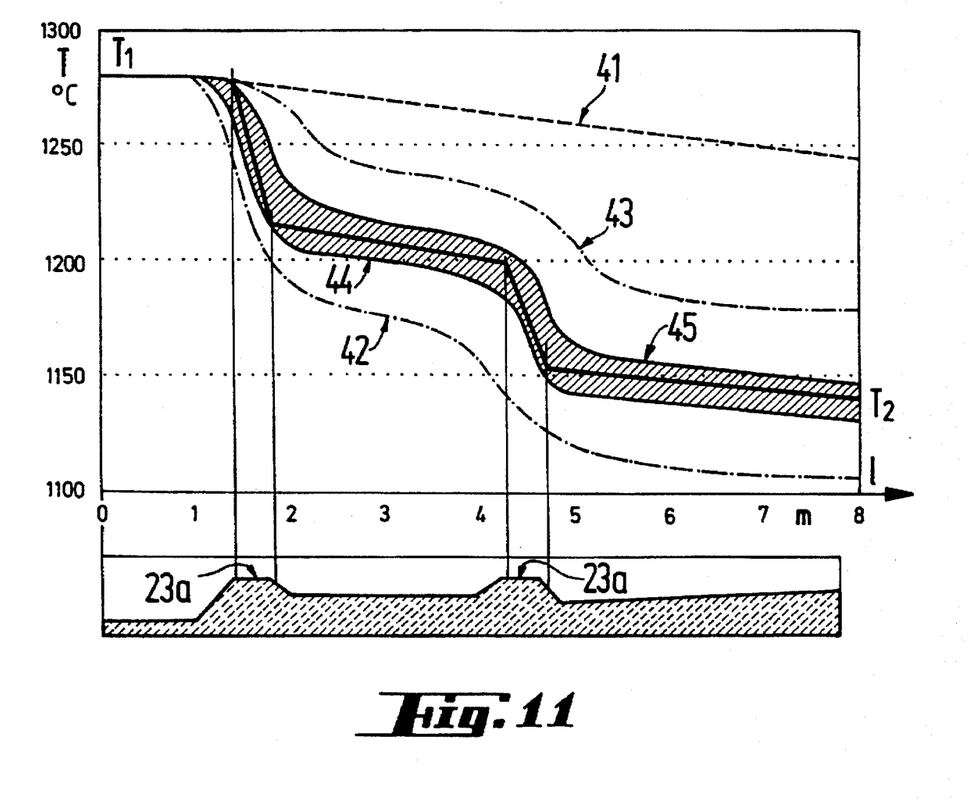
FIG. 11 graphically shows temperature values at several measuring points along the complete length of the distribution channel shown in FIG. 7, with comparative figures.

Diagram 11 shows values that have been either measured on or calculated for a distribution channel according to the invention as illustrated in FIG. 7. The x-axis shows the distance from the center line of the riser in meters whilst the y-axis shows temperature in °C. The diagrammatic representation of the vertical profile of the distribution channel bottom, showing the two raised areas 23a, is drawn under the x-axis, whereby the diagram is reversed compared with that shown in FIG. 7.

The temperature near the riser is T1, whilst the temperature at the entry to the forehearth 13 is T2.

Line 41 shows the temperature progression which would be obtained if no forced cooling effect were applied, i.e. the result of the fact that all insulation materials are not perfect insulators. Lines 42 and 43 show two temperature progressions which would be obtained if the glass were to pass through the cooling zones containing the openings 28, without the raised areas 23a of the bottom. The lower line 42 represents the surface temperature and the upper line 43 the bottom temperature of the glass. The large and increasing difference between the two lines occurs because the bottom glass is subjected to a significantly reduced cooling effect from the openings 28 than is the case for the surface glass. On the basis of the point explained above, it is clear that these differences will increase as the glass color becomes darker. The lines 42 and 43 will also be displaced upwards in the case of colored glasses, which means that the final average temperature after the homogenization will be considerably higher than the exit temperature T2, which results from the application of the invention. The large difference between the lines 42 and 43 at the end of the flow path shown in FIG. 11 means that an extremely long homogenizing zone would be needed, together with intensive efforts, in order to significantly reduce the temperature differences.

The lines 44 and 45 represent the conditions obtained using the raised areas 23a of the bottom as shown in the diagram underneath the x-axis in FIG. 11. As a result of the limited glass bath depth above the raised areas 23a, the bottom glass participates in the energy removal process to a much larger extent. For this reason, together with the mixing of the glass in the part of the glass bath immediately above the raised areas 23a, the temperature differences are reduced along the complete length of the distribution channel, and are illustrated by the shaded area in the diagram. The solid line drawn in the middle of the shaded area shows the mathematical average of the two values at each location along the distribution channel.

As also indicated in FIG. 11, a much lower temperature difference at the end of the distribution channel means that a much shorter homogenization zone is required in order to bring the surface and bottom temperatures nearer to the average value.

The flow cross section above each raised area 23a (one or more), which is the product of the glass bath depth T and the width W, is determined by the throughput and the average flow velocity. The width of each opening 28 (one or more), transversely to the direction of flow, is less than the width B of the glass bath as unwanted cooling of the side areas must be avoided, whereby a weak or minimal heating of the side areas, preferable with burners, is possible.

The specified flow parameters are used to determine the length of the or any cooling section, i.e. the length of the or any openings 28 and of the or any raised areas 23a. The width is determined by the actual width of the distribution channel, so that no glass can bypass the system. FIG. 11 provides a basis for the determination of the length of the openings 28 and of the raised areas 23a: the temperatures T1 and T2 are given by the melting tank and the forehearth or feeder. The relatively small temperature drops outside of the cooling zones are also determined by known factors. However, the steepness of the lines in FIG. 11 in the region of the raised areas 23a and openings 28 illustrates the relatively sharp temperature drop over a very short distance. This also gives an indication of the length of raised area and opening necessary for the cooling zones described, whereby the residence time must also be included in the calculation, which can be determined on the basis of the throughput and the flow velocity. FIG. 7 shows a scale drawing of a version of such a system which has been successfully tested.

With a wide, shallow glass bath, the average temperature is reduced significantly along the relatively short cooling zone, which is shown by the steep temperature curve in the region of the raised area 23a. In this way, with a given total length, there is a relatively long stretch available for the following homogenization zone(s), along which the average temperature remains largely unchanged. Despite the steep temperature drop in the cooling zone(s), and the even average temperature in the homogenization zone(s) the edge zones on both sides of the wide glass bath may be additionally heated, as shown for the cooling zone in FIGS. 2–4 (burner arrangement). Attention must merely be paid to the attainment of the best possible homogeneous temperature distribution, by the combined effect of shallow bed cooling, edge and, where necessary, surface heating. However, a relatively long flow path is available in the homogenization zone(s), and in the cooling zone(s) conditions have been established which ensure that the temperature differences at the individual points of the glass bath cross section are not too great at the entry to the homogenizing zone(s). As the glass depth is small compared with the width B, the heat losses through the side walls 24 are reduced, which also improves homogeneity and saves energy.

When the complete situation is considered it is clear that it is particularly important to install the section with the highest cooling capacity as close to the beginning of the conditioning stretch as possible. In the case of distribution channels or working ends, this means as soon as possible after the throat of the melting tank.

By consideration of the invention, special attention should be paid to the high throughputs or average flow velocities and temperature differences. Modern working ends have average flow velocities of 4.5 to 5.5 m/h at high loads. In a working end dimensioned and operated according to the invention, with a glass bath 1500 mm wide and 150 mm deep, which gives a ratio of D/W=0.1, very good results were achieved with throughputs of 100 to 150 tons/day. The flow velocities were approximately 7–11 m/h, without any detrimental effect on the temperature homogeneity of the glass at the extraction point.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method of conditioning and homogenizing a continuously flowing stream of glass along a conditioning stretch, said conditioning stretch extending from an entry side of at least one of a working end or distribution channel to at least one extraction point of said at least one of a working end or distribution channel, at a beginning of said conditioning stretch there is at least one cooling zone to which at least a homogenizing zone for homogenizing the glass temperature is connected, whereby in the conditioning stretch the glass temperature is reduced from an entry temperature T1 to an extraction temperature T2, said method comprising arranging for in said at least one cooling zone a vertical cross section of a glass stream having a depth/width ratio D/W of a maximum of 0.6, which is created by at least one bank raised out of a bottom of said conditioning stretch in said cooling zone, whereby a maximum glass depth Dmax of the glass stream is about 300 mm and the temperature difference in the glass stream between T1 and T2 is reduced by at least 50% in said at least one cooling zone.

2. A method according to claim 1, wherein in said at least one cooling zone the vertical cross section of the glass stream is provided such as to have a depth/width ratio D/W of a maximum 0.5.

3. A method according to claim 1, wherein in said at least one cooling zone the vertical cross section of the glass stream is provided such as to have a depth/width ratio D/W of a maximum 0.4.

4. A method according to claim 1, wherein in said at least one cooling zone the vertical cross section of the glass stream is provided such as to have a depth/width ratio D/W of a maximum 0.3.

5. A method according to claim 1, wherein in said at least one cooling zone the vertical cross section of the glass stream is provided such as to have a depth/width ratio D/W of a maximum 0.2.

6. A method according to claim 1, wherein the maximum depth Dmax is about 250 mm.

7. A method according to claim 1, wherein the maximum depth Dmax is about 200 mm.

8. A method according to claim 1, wherein the temperature difference between T1 and T2 is reduced by at least 60% in the glass stream along a complete length of said at least one cooling zone.

9. A method according to claim 1, wherein the temperature difference between T1 and T2 is reduced by at least 70% in the glass stream along a complete length of said at least one cooling zone.

10. An apparatus for conditioning and homogenizing a glass stream flowing along a conditioning stretch, said apparatus comprising:
 a conditioning stretch extending between an entry side of a working end or distribution channel and at least one extraction point of said working end or distribution channel; and
 at least one cooling zone positioned in said conditioning stretch and including means for controlling a glass stream flowing through said cooling zone so that said glass stream has a depth/width ratio D/W of a maximum of 0.6 and has a maximum glass depth Dmax in said at least one cooling zone of about 300 mm.

11. The apparatus of claim 10 in which said conditioning stretch includes at least one homogenizing zone connected to said cooling zone for homogenizing a temperature of said glass stream in said conditioning stretch.

12. The apparatus of claim 10 in which said means for controlling the glass stream comprises at least one raised bank on a bottom of said conditioning stretch in said at least one cooling zone.

13. The apparatus of claim 12 in which said at least one cooling zone above said at least one raised bank, the glass stream has a vertical cross section with a depth/width ratio D/W of a maximum 0.5.

14. The apparatus of claim 12 in which in said at least one cooling zone above said at least one raised bank, the glass stream has a vertical cross section with a depth/width ratio D/W of a maximum 0.4.

15. The apparatus of claim 12 in which in said at least one cooling zone above said at least one raised bank, the glass stream has a vertical cross section with a depth/width ratio D/W of a maximum 0.3.

16. The apparatus of claim 12 in which in said at least one cooling zone above said at least one raised bank, the glass stream has a vertical cross section with a depth/width ratio D/W of a maximum 0.2.

17. The apparatus of claim 12 in which an immersion cooler is positioned in said glass stream downstream of said at least one raised bank.

18. The apparatus of claim 17 in which mounting means are operatively associated with said immersion cooler for permitting said immersion cooler to be selectively raised and lowered.

19. The apparatus of claim 17 in which mounting means are operatively associated with said immersion cooler for permitting said immersion cooler to be moved periodically horizontally at right angles to the direction of flow of said glass stream.

20. The apparatus of claim 17 in which said immersion cooler is in the form of a stirrer.

21. The apparatus of claim 10 in which said maximum glass depth Dmax does not exceed 250 mm.

22. The apparatus of claim 10 in which said maximum glass depth Dmax does not exceed 200 mm.

* * * * *